A. A. DAILEY.
PLOW.
No. 107,228. Patented Sept. 13, 1870.
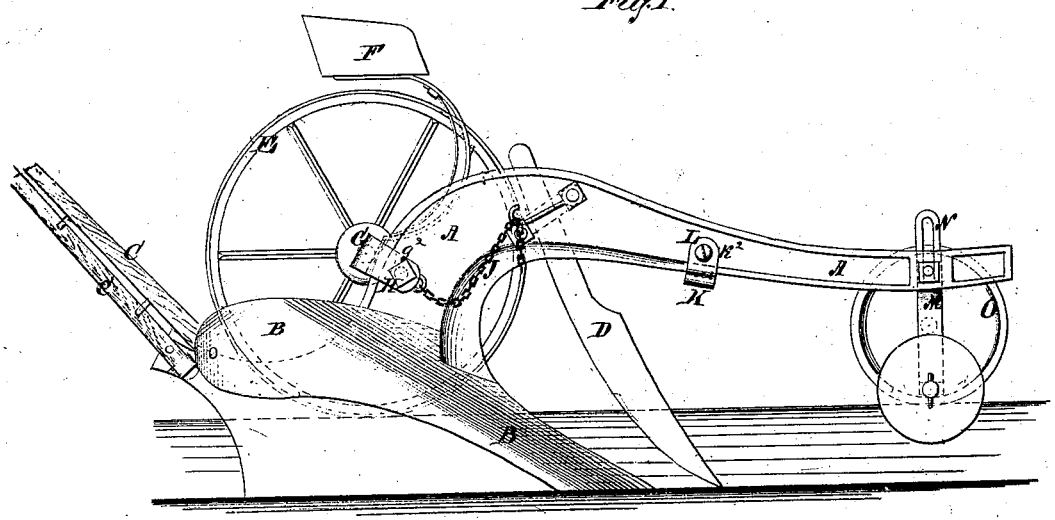
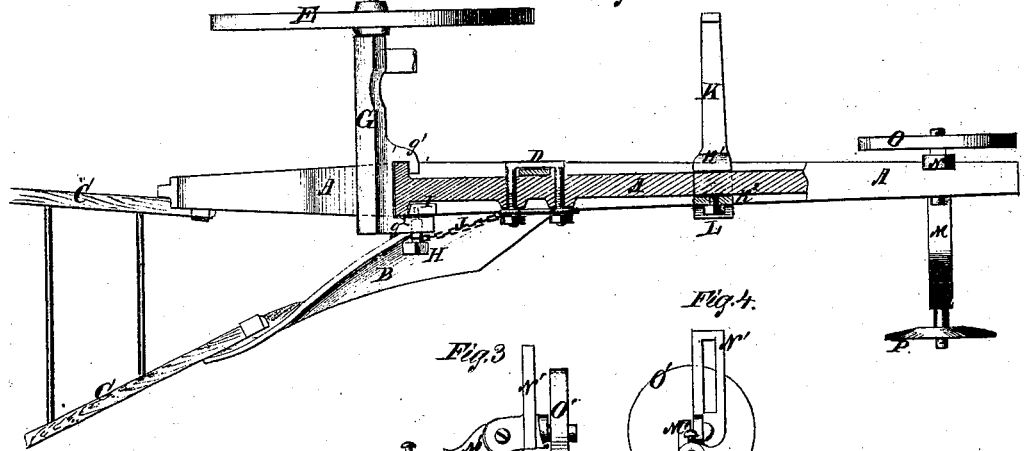
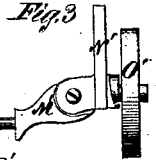
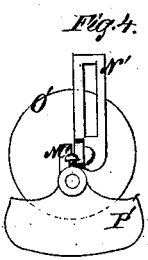
Witnesses:
Inventor:

United States Patent Office.

ALBERT A. DAILEY, OF WILSON, NEW YORK.

Letters Patent No. 107,228, dated September 13, 1870.

IMPROVEMENT IN PLOWS.

The Schedule referred to in these Letters Patent and making part of the same

To all whom it may concern:

Be it known that I, ALBERT A. DAILEY, of Wilson, in the county of Niagara and State of New York, have invented a new and useful Improvement in Plows; and I do hereby declare that the following is a full, clear, and exact description thereof, which will enable others skilled in the art to make and use the same, reference being had to the accompanying drawing forming part of this specification, in which—

Figure 1 is a side view of my improved plow.

Figure 2 is a top view of the same, parts being broken away to show the construction.

Figure 3 is a front view of a modified form of the gauge-wheels.

Figure 4 is a side view of the same.

My invention has for its object to improve the construction of plows, so as to make them more convenient in use, and more effective in operation; and It consists in the construction and combination of various parts of the plow, as hereinafter more fully described.

A represents the plow-beam.

B is the mold-board.

C are the handles, and

D is the cutter, about the construction of which parts there is nothing new.

E is a large wheel, by which the driver's seat, F, is supported, and which revolves upon the journal of the axle G.

The inner end of the axle G has lugs, $g^1$ $g^2$, formed upon its lower side, to embrace and slide upon the upper flanged edge of the beam A, one of said lugs, as $g^1$, being hooked, and the other, $g^2$, being straight, as shown in fig. 2.

H is a set-screw, which passes through a screw-hole in the straight lug $g^2$, and the end of which works in a socket in the block I, interposed between the straight lug $g^2$ and the side of the plow-beam A, beneath the top flange of said side. This construction allows the axle to be adjusted vertically on the beam A, and also longitudinally thereof to a certain extent, whereby the portion of the weight of the driver, which is borne by the plow, may be imposed on it at a point nearer the wheel O, and thus, to that degree, removed from the plow B.

J is a chain, the rear end of which is connected with the inner end of the axle G, and the other end of which is hooked upon a hook, or other catch, connected with the bolts that secure the cutter, or with some other part or attachment of the beam A. The chain J is designed to assist in governing the wheel E, and in adjusting its position.

K is an iron bar or step, designed to support the driver's feet.

Upon the upper side of the inner end of the bar K is formed two lugs, $k^1$ $k^2$, which embrace the lower flanged edge of the beam A, where the said foot-rest or bar is adjustably secured in place by a set-screw, L, passing through one of the lugs, as $k^2$, and the point of which presses against the side of the beam A, so that the position of the step K may be conveniently adjusted according to the length of the driver's legs.

M is the gauge-wheel axle, the middle part of which is made inclined or curved, so that the land-side journal of said axle may be at a higher level than the other or plowed-land journal.

N is an arm or standard, the lower end of which is rigidly connected to the axle M.

The arm N is slotted to receive the bolt by which it is secured to the beam A, so that it may be readily raised and lowered to regulate the depth at which the plow works in the ground.

To the land-side journal of the axle M is attached the gauge-wheel O, which rolls along the surface of the ground to regulate the depth at which the plow enters the ground.

To the outer journal of the axle M is attached a gauge-plate, P, which may be made in the form of a wheel, and its position upon said journal may be adjusted by a tubular washer or washers placed upon said journal upon one or the other side of said wheel, as may be desired.

In figs. 3 and 4 is shown a different construction, N' indicating the slotted arm, M' the axle jointed thereto, O' the wheel, and P' a gauge-plate.

The latter construction I prefer, as it enables the plate, when back-furrowing and cutting first furrows, to be set so as to regulate the plow, instead of being removed, as is necessary in such cases when the plate is made in the form of a wheel.

Having thus described my invention,

I claim as new and desire to secure by Letters Patent—

The combination of the curved or inclined axle M', slotted pivoted arm N', and gauge-plate P', with each other and with the plow-beam A, substantially as herein shown and described, and for the purpose set forth.

A. A. DAILEY

Witnesses:
   J. E. PARCEL,
   CHAS. B. GROUT.